United States Patent
Richard et al.

(10) Patent No.: US 7,354,514 B2
(45) Date of Patent: Apr. 8, 2008

(54) METHOD FOR ISOLATING AND DRYING MICROPARTICLES (MICROSPHERES OR MICROCAPSULES) INITIALLY DISPERSED OR SUSPENDED IN LIQUID PHASE

(75) Inventors: Joël Richard, Longue (FR); Patrice Romain, Rouen (FR)

(73) Assignee: Ethypharm S.A., Saint-Cloud (FR)

( * ) Notice: Subject to any disclaimer, the term of this patent is extended or adjusted under 35 U.S.C. 154(b) by 511 days.

(21) Appl. No.: 10/381,001

(22) PCT Filed: Sep. 21, 2001

(86) PCT No.: PCT/FR01/02943

§ 371 (c)(1),
(2), (4) Date: Aug. 15, 2003

(87) PCT Pub. No.: WO02/24305

PCT Pub. Date: Mar. 28, 2002

(65) Prior Publication Data

US 2004/0009230 A1    Jan. 15, 2004

(30) Foreign Application Priority Data

Sep. 21, 2000    (FR) .................................. 00 12027

(51) Int. Cl.
*B01D 33/11*    (2006.01)
(52) U.S. Cl. ...................... 210/297; 424/400
(58) Field of Classification Search ................ 428/402
See application file for complete search history.

(56) References Cited

U.S. PATENT DOCUMENTS

| 3,952,541 A | 4/1976 | Rigoli |
| 4,037,331 A | 7/1977 | Brilloit |
| 4,248,709 A | 2/1981 | Irving |
| 5,131,170 A | 7/1992 | Rilke |
| 5,858,531 A * | 1/1999 | Chenite et al. .............. 428/402 |
| 5,958,778 A * | 9/1999 | Kidd ........................... 436/45 |
| 5,964,043 A | 10/1999 | Oughton et al. |

FOREIGN PATENT DOCUMENTS

| EP | 0 444 443 A1 | 9/1991 |
| FR | 2 298 777 | 8/1976 |
| FR | 2 383 412 | 10/1978 |
| GB | 286 855 A | 3/1928 |
| WO | WO 96 29556 | 9/1996 |

* cited by examiner

Primary Examiner—Michael G. Hartley
Assistant Examiner—Eric E. Silverman
(74) Attorney, Agent, or Firm—Buchanan, Ingersoll & Rooney, PC

(57) ABSTRACT

A process for separating and drying microparticles initially dispersed in a liquid phase, comprising the steps:
- placing a preparation comprising microparticles dispersed or suspended in a liquid phase in a filtration container placed inside a chamber;
- filtering a fraction of the liquid phase through the container in the chamber; and
- varying the temperature and the pressure throughout the chamber in order to freeze dry the filtered preparation in the container maintained in the chamber.

22 Claims, 5 Drawing Sheets

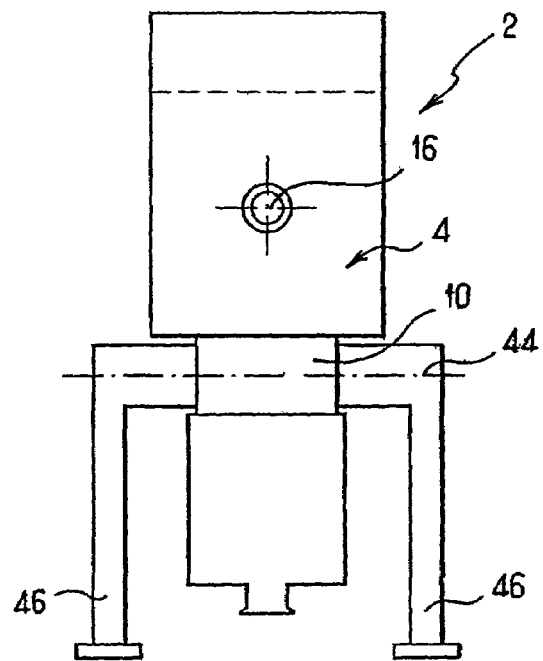
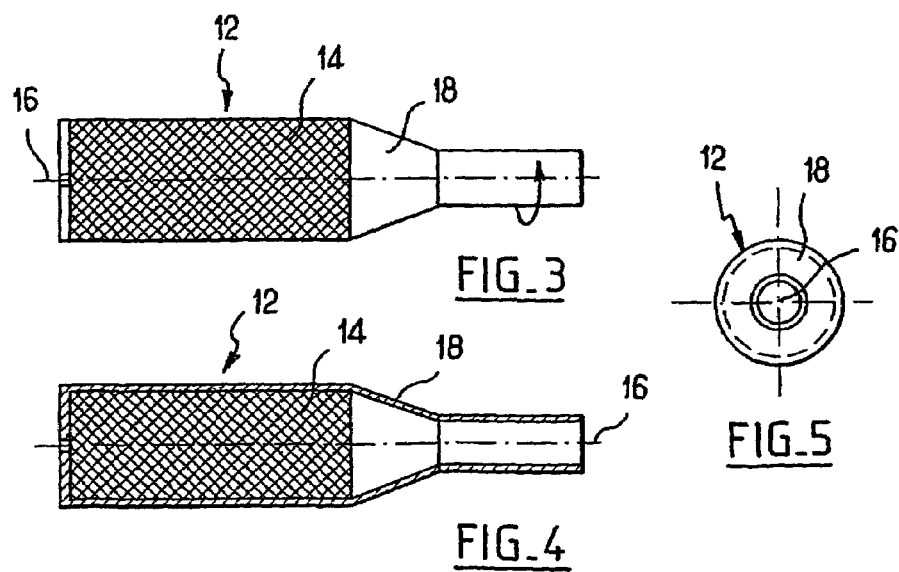

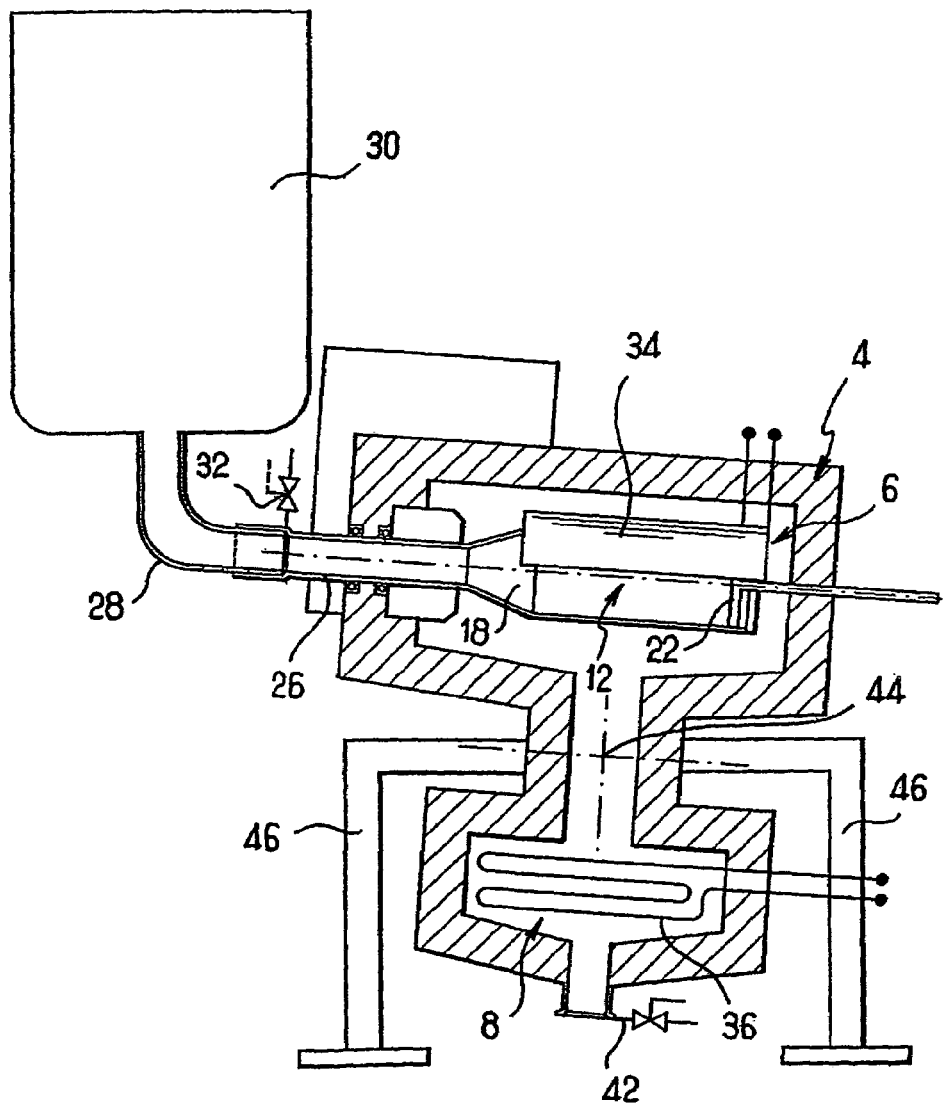
FIG_6

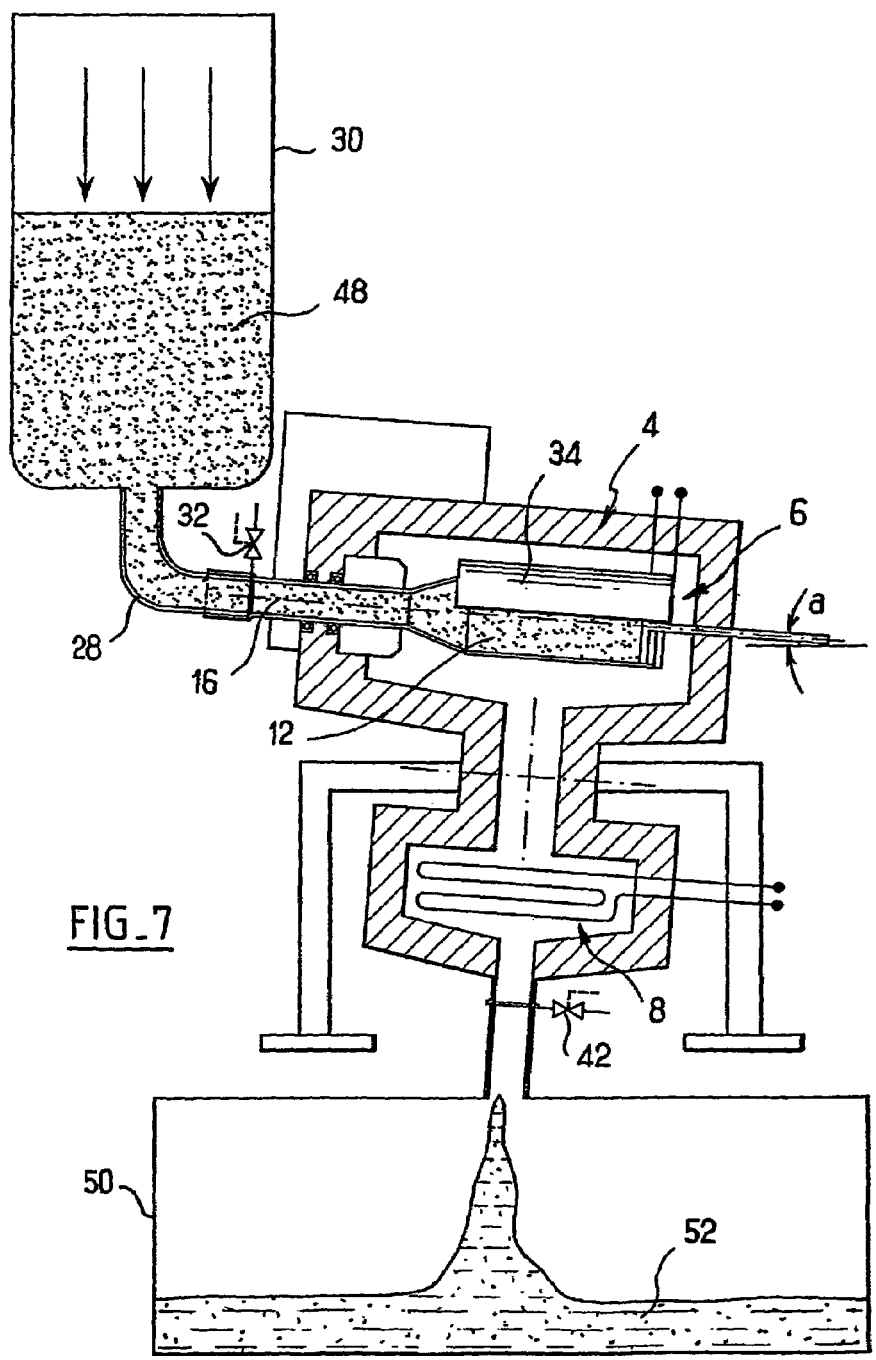
FIG_7

METHOD FOR ISOLATING AND DRYING MICROPARTICLES (MICROSPHERES OR MICROCAPSULES) INITIALLY DISPERSED OR SUSPENDED IN LIQUID PHASE

The invention relates to the manufacture of microspheres and microcapsules, and more particularly to the separation of the latter from a liquid phase and to their drying.

It is known that microparticles, such as microspheres and microcapsules for pharmaceutical use, are generally produced within a liquid phase from which they are then extracted in order to make solid dry forms therefrom, these being administrable either in the form of powders or in the form of reconstituted liquid suspensions. They may be prepared by processes known to those skilled in the art, such as emulsion/solvent evaporation (or extraction) methods or simple or complex preservation methods. To separate them from the liquid phase, a known process comprises the step of filtering the preparation so as to remove most of the liquid phase. The resulting filtrate forms a concentrated pasty cake of microparticles containing a residue of the liquid phase. This cake is then scraped and/or raked in order to detach it from the filter and the cake is placed in a freeze-drying chamber. Freeze drying allows the residual liquid phase to be extracted in order to obtain a mass of dry microspheres, which will thus be able to be preserved in a stable manner.

However, this process has many drawbacks from the industrial standpoint. Firstly, in the case of pharmaceutical forms of microparticles (microspheres or microcapsules) intended to be injected (parenterally), the product must be sterile. Consequently, all the manufacturing steps are carried out in a room with a Class 100 controlled atmosphere (sterile atmosphere). However, to obtain such conditions in large working chambers is very expensive. It is therefore endeavored to confine the product as much as possible for each step. However, to transfer the product from one apparatus to another means passing it into an open environment. It is therefore either very difficult or very expensive to ensure sterility.

In addition, it has been found that the aforementioned process has a mediocre yield since the various product handling operations result in losses (on the filter, the freeze dryer, in the transfer container, etc.)

It is an objective of the invention to make it easier to produce sterile dry microparticles and to improve their yield.

To achieve this objective, the invention provides a process for separating and drying microparticles initially dispersed in a liquid phase, comprising the steps consisting in:
  placing a preparation comprising microparticles dispersed or suspended in a liquid phase in a filtration container placed inside a chamber;
  filtering a fraction of the liquid phase through the container in the chamber; and
  varying the temperature and the pressure throughout the chamber in order to freeze dry the filtered preparation in the container maintained in the chamber.

Thus, by carrying out the filtration and the freeze drying in the same chamber it is possible to reduce the volume to be confined. In addition, there is no transfer of the product between these two steps, which transfer was a major factor in the break in sterility and the drop in yield. It is therefore easier and less expensive to obtain a sterile dry product.

Advantageously, the container is set or kept in motion during part or all of the filtration step.

Advantageously, the container is set in motion during part or all of the freeze-drying step.

Thus, this motion means that, during these steps, the cake is further distributed, and more homogeneously, over the internal surface of the container. The layer of cake that forms is finer and more uniform, thereby making it easier to extract the liquid phase. In addition, the filtration and/or freeze drying are carried out more rapidly.

Advantageously, the motion comprises a rotational motion.

The rotation particularly enhances these advantages.

Advantageously, the rotation is carried out about an axis of symmetry of the container.

Advantageously, the axis of symmetry is an axis of symmetry of revolution of the container.

Advantageously, the rotation is carried out about a non-vertical axis.

Thus, a particularly uniform distribution of the cake over the wall of the container is obtained, further improving the aforementioned advantages.

Advantageously, the axis of rotation makes an angle of less than 25° with the horizontal.

Advantageously, the container comprises a profiled portion.

Advantageously, the container comprises a cylindrical portion.

Advantageously, the preparation is put under an overpressure during the filtration step.

Advantageously, after the freeze-drying step, the inside of the chamber is put under a gas overpressure.

Thanks to this overpressure, at least part of the freeze-dried cake separates from the wall, thereby making its subsequent recovery easier.

Advantageously, after the freeze-drying step, balls are introduced into the container and the container is set in motion.

These balls break up the cake and make its subsequent extraction easier.

Advantageously, after the freeze-drying step, the inside of the container is scraped.

Advantageously, after the freeze-drying step, the microparticles are extracted from the container by gravity.

The invention also provides an apparatus for isolating microparticles initially dispersed or suspended in a liquid phase, comprising a filtration container, a chamber and means for modifying the temperature and the pressure throughout the chamber, in which apparatus the container lies within the chamber.

The apparatus according to the invention may furthermore have at least one of the following features:

- the filtration container is mounted so as to move in the chamber;
- the filtration container is mounted so as to move in rotation;
- the filtration container is mounted so as to move in rotation about an axis of symmetry of the container;
- the axis is an axis of symmetry of revolution of the container;
- the apparatus is designed so that the axis of rotation is inclined to the vertical;
- the apparatus includes means for modifying the angle of inclination of the rotation axis;
- the container has a cylindrical filtration wall;
- the apparatus includes heat exchange means that have the same shape as a part of the container and are placed coaxially with respect to said part;
- the container has, at an axial end thereof, an opening for introduction and/or removal; and the apparatus includes means for scraping an internal face of the container.

Further features and advantages of the invention will become more clearly apparent in the following description of a preferred embodiment given by way of nonlimiting example.

In the appended drawings:

FIG. 2 is a view from the left of the apparatus of FIG. 1;

FIG. 3 is a front view of the filtration container of the apparatus of FIG. 1;

FIG. 4 is an axial sectional view of the filtration container of FIG. 3;

FIG. 5 is a view from the right of the container of FIG. 3; and

FIGS. 6 to 9 are views similar to FIG. 1 illustrating various successive steps in the implementation of the process according to the invention.

Figure 1:
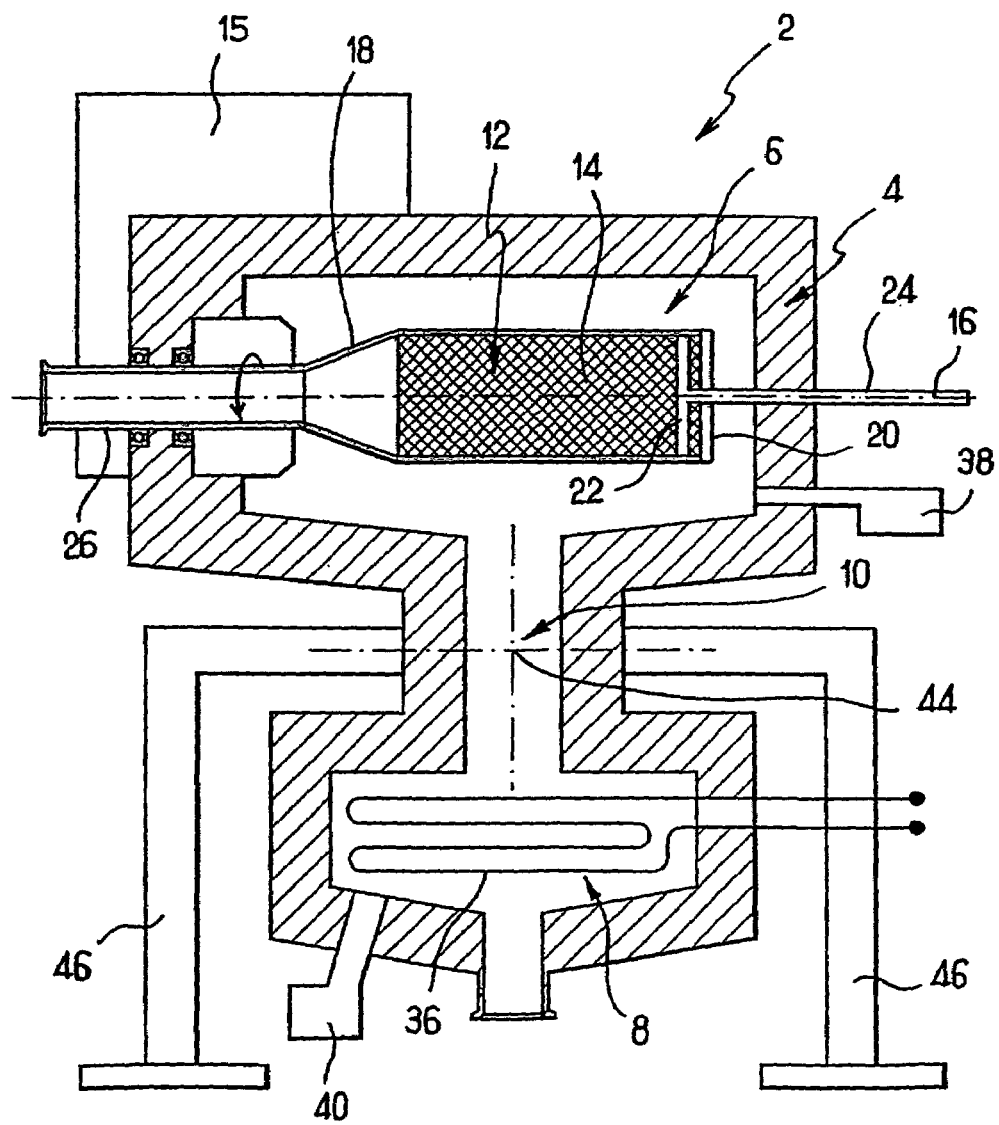
FIG. 1 is a sectional view illustrating one example of the main elements of the apparatus according to the invention.

Referring to FIG. 1, the apparatus 2 according to the invention intended to separate and dry microparticles initially in a liquid phase comprises a chamber 4 having an upper chamber part 6 and a lower chamber part 8 called a "trap" or condenser. The two chamber parts lie one above the other and are separated from one another by a restriction 10 through which they communicate. The apparatus includes a filtration container 12 lying in the upper chamber part 6. The filter container has an axis 16. It is profiled along this axis and has a circular cross section. The filtration container has here a cylindrical filter wall 14. This wall has micro-orifices capable of letting through the liquid, in this case aqueous, phase of the preparation containing the microspheres, without letting the microspheres escape. This wall, known per se, may be made of various materials:

hollow ceramic;

sintered stainless steel; or sintered synthetic material (for example polyethylene).

Alternatively, the wall 14 may have a rigid layer perforated with large-diameter holes and, on the inside, a fine membrane supported by said layer. The membrane may be a fabric made of stainless steel, cellulose acetate, nylon, etc.

The choice of the material of the wall 14 will depend on the characteristics (cost, dimensions, material compatibility) of the microspheres to be recovered.

The container has, at an axial end of the wall, on the left in FIG. 1, a frustoconical portion 18, for example made of stainless steel. The largest cross section of the portion 18 is joined to the cylindrical wall 14. The cylindrical wall 14 here has a length of about 25 cm. The wall 14 may be joined to the portion 18 by screwing, clamping or welding. The other axial end of the container is closed off by a disk-shaped cylinder head 20.

The container 12 includes a scraper piston 22 in the form of a disc of axis 16 having a slightly larger diameter than the diameter of the internal face of the cylindrical wall 14. This scraper is connected to a straight actuating rod 24 lying along the axis 16 and passing through the center of the cylinder head 20. The scraper can move so as to slide over the entire length of the wall 14.

The filtration container 12 is mounted so as to move in rotation in the upper chamber part 6 relative to the chamber 4, about its axis 16. The rod 24 passes through the wall of the chamber 4 in a sealed manner so that it can be operated from outside the chamber.

The container 12 is guided in rotation and supported by a hollow cylindrical shaft 26, of axis 16, passing through the wall of the chamber so as to be joined to the narrow end of the portion 18. The inside of the shaft 26 thus opens into the container 12. Ball bearings act as bearing between the wall of the seating and the shaft. Sealing means are provided at this point in order to isolate the inside of the chamber from the outside.

Referring to FIG. 6, the end of the shaft 26 furthest away from the container 12 may be connected to a pipe elbow 28 of the same diameter, which itself communicates with a reactor 30 for preparing the microspheres. In this way, the inside of the chamber communicates with the reactor only via the container, specifically via the orifices in its wall 14. The apparatus includes a valve 32 for cutting off communication between the shaft 26 and the pipe elbow 28 so as to isolate the inside of the chamber from the reactor 30 in a sealed manner.

Referring to FIG. 1, the apparatus includes a motor 15 capable of making the shaft 26 together with the container 14 rotate about the axis 16.

Referring to FIG. 6, the apparatus includes a heat 10 exchange coil 34 formed by a pipe in fluid communication on the outside of the chamber with a heating or refrigerating (from −60° C. to +40° C.) unit. The coil 34 has the shape of a half-cylinder, in order to form a half-shell. Its inside diameter is slightly greater than the outside diameter of the wall 12. The coil 34 lies in the upper chamber part 6 opposite the upper half-cylinder of the wall 14, which it thus conceals. The apparatus includes, in the trap 8, a condenser coil 36 in fluid communication on the outside of the chamber with a refrigerating unit in order to keep the trap at, for example, −60° C.

The two coils are coursed by suitable heat-transfer fluids.

The apparatus furthermore includes means 38 for introducing liquid nitrogen into the upper chamber part 6 for the purpose of causing rapid freezing, before the freeze drying. It also includes a pump 40, for example a vane pump, for creating a high vacuum throughout the chamber 4, for the purpose of freeze drying.

Referring to FIG. 6, the lower end of the trap 8 can be closed off at will by a sealing valve 42.

The whole assembly formed by the chamber and the components contained in it is mounted so as to move in rotation about a horizontal axis 44 perpendicular to the plane of FIG. 1 and passing geometrically through the restriction 10. For this purpose, the apparatus includes support means 46 for supporting the chamber on the base, allowing this rotation. This rotation makes it possible to modify the inclination of the axis 16 to the horizontal.

The chamber is a welded assembly, made of stainless steel, and jacketed with a thermally insulated jacket. The inside is smooth, with rounded corners and with no retention areas for easy cleaning.

Using this apparatus, the process according to the invention is in this case carried out in the following manner in order to manufacture microspheres for pharmaceutical use.

Referring to FIG. 6, the pipe 26 is connected to the reactor 30 via the sealed rotary flange provided for this purpose. The scraper piston 22 is in the retracted position.

Pressurized steam at 120° C. is injected from the reactor 30 for 20 min in order to sterilize all of the components (container, chamber, etc.) Any condensates are recovered at the bottom of the trap 8.

Referring to FIG. 7, the container 14, having returned to room temperature, is then set in rotation. The inclination of the chamber is chosen so that the angle a between the axis 16 and the horizontal is 5°, the portion 18 forming the upstream part of the container.

The reactor 30 contains a dispersion 48 of microspheres in suspension in an aqueous phase. It may, for example, be an aqueous dispersion 48 of lactic acid/glycolic acid copolymer (PLGA) microparticles having a mean diameter of 50 µm, prepared by emulsion/solvent extraction. This dispersion is put under pressure and then sent into the container 12. Owing to the effect of pressure and gravity, the liquid travels along the pipe elbow 28, the shaft 26 and the filtration container 12 (in which the slight slope eliminates any retention areas), then passes through the wall 14 and runs down as far as the bottom of the trap 8. Since the valve 42 is open and connected to a reservoir 50, the liquid 52 collects in the latter. There remains in the container 14 a pasty cake of microspheres distributed over the entire internal cylindrical face of the wall 142 as a thin layer owing to the effect of the rotation.

Next, the inside of the chamber is isolated in a sealed manner from the outside by closing the two valves. The machine is then disconnected from the reactor 30 and the reservoir 50.

Figure 8:
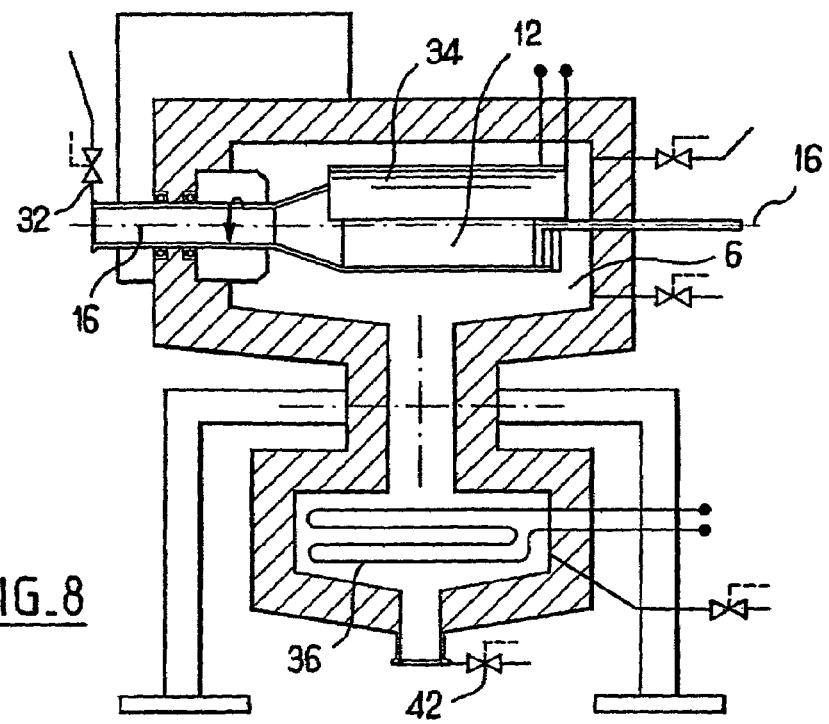

Referring to FIG. 8, the inclination of the axis 16 is modified so that it is horizontal. Liquid nitrogen is sent into the upper chamber part 6 in order to take the entire inside of the chamber down to −60° C. and to rapidly freeze the cake of microspheres. The container 12 is still rotating. A high vacuum is then created in the two chamber parts 6, 8 (that is to say throughout the inside of the chamber) by means of the pump 40.

The freeze-drying phase is then started. To do this, the trap 8 is maintained at −60° C. by means of the coil 36, while, by means of the half-shell coil 34, the temperature of the upper chamber part 6 is brought The container continues to rotate.

After the freeze-drying step, the liquid has been extracted from the cake and has crystallized in the trap 8. The cake of microspheres in the filtration container 12 is now dry.

Figure 9:
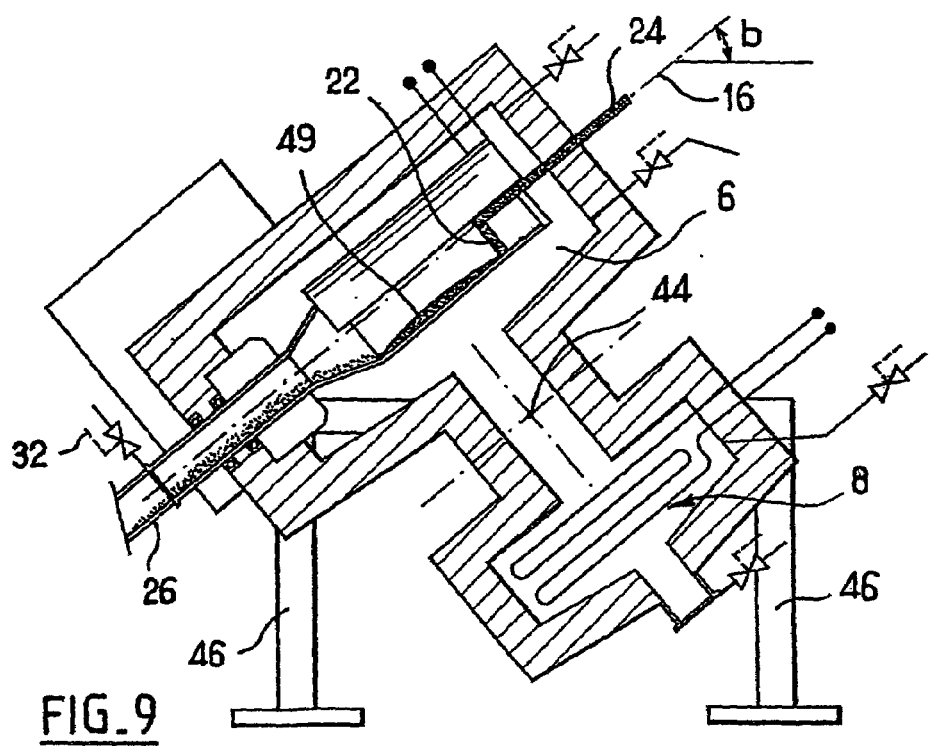

Referring to FIG. 9, the chamber is tilted (counterclockwise with respect to FIG. 7) so that the axis 16 now makes an angle of 40° with the horizontal, the portion 18 this time forming the downstream part of the container. The inside of the chamber is brought to room temperature, by opening the valve 32 and connecting it to a screen. To extract the cake 49 from the container, compressed air is injected in pulses into the upper chamber part 6 in order to separate the cake from the wall 14, thereby causing at least part of the cake to run down by gravity as far as the screen. The inside of the container is then scraped from the upstream end to the downstream end using the piston 22 in order to complete the separation and/or removal of the residual cake.

Furthermore, or alternatively, provision may be made to introduce balls into the rotating container so as to break up the cake and separate it from the wall owing to the effect of the motion of the balls contained in the container.

It may therefore be seen that the process according to the invention combines filtration and drying in the same container and the same chamber, without any human intervention on the product, in particular without transfer from the container.

As has been seen, the plant may be connected beforehand to the reactor for initial sterilization (steam pressure process). Thereafter, the separation, freeze-drying and recovery operations may be carried out under strictly confined conditions, which completely ensure the sterility quality of the product.

The cylindrical nature of the rotating filtration system allows the cake of microspheres to be uniformly distributed, this being a favorable aspect for obtaining optimum freeze drying.

In addition, the developed surface area of the cylindrical shape makes it possible to obtain cake thicknesses that are small compared with filters having a plane surface. In addition, the plant is more compact than a shelf freeze dryer.

Since the cake of freeze-dried product frequently has a degree of cohesion at the end of freeze drying, the scraping system makes it possible to remove the lyophilizate without manual intervention—handling being necessary however in order to recover the dried product in trays (by means of a shelf freeze dryer or a drying cabinet).

The process according to the invention also avoids having to rinse the cake with a large amount of water, as is sometimes the case in known processes, which has the drawback of initiating the release of the product encapsulated in the microspheres.

Of course, many modifications may be made to the invention without departing from the scope thereof. The invention may be applied to the production of microspheres or microcapsules in the human or veterinary pharmaceutical fields, in the cosmetics field and in other industrial fields, such as in textiles, fine chemicals, printing, etc.

The filtration container may have an axisymmetric shape other than that of a cylinder. It could, for example be a sphere, however this does not allow scraping.

The filtration container may have a shape other than that of a body of revolution about an axis, for example a profiled shape of polygonal cross section.

Moreover, the operating parameters (inclination, temperature, durations, etc.) may be modified.

As a second example, the same microparticle isolating and drying procedure may be applied to an aqueous dispersion of crosslinked gelatin/alginate microcapsules containing an active substance dispersed in an oily phase, these being initially prepared by complex coacervation in the reactor 30 and having a mean size of 100 µm.

The invention claimed is:

1. A process for separating and drying microparticles initially dispersed in a liquid phase, comprising the steps:
   placing a preparation comprising microparticles dispersed or suspended in a liquid phase in a filtration container placed inside a chamber;
   filtering a liquid fraction of the liquid phase through the container in the chamber; and
   varying the temperature and the pressure throughout the chamber in order to freeze dry the filtered preparation in the container maintained in the chamber.

2. The process as claimed in claim 1, wherein the filtration container is in motion during part or all of the filtration step.

3. The process as claimed in claim 1, wherein the filtration container is in motion during part or all of the freeze-drying step.

4. The process as claimed in claim 2, wherein the motion comprises a rotational motion.

5. The process as claimed in claim 1, wherein the container has a cylindrical portion.

6. The process as claimed in claim 1, wherein the preparation is put under an overpressure during the filtration step.

7. The process as claimed in claim 1, wherein, after the freeze-drying step, the inside of the chamber is put under a gas overpressure.

8. The process as claimed in claim 1, wherein, after the freeze-drying step, balls are introduced into the container and the container is set in motion.

9. The process as claimed in claim 1, wherein, after the freeze-drying step, the inside of the container is scraped.

10. An apparatus for performing the process of claim 1, comprising a filtration container, a chamber and means for modifying the temperature and the pressure throughout the chamber for the purpose of freeze-drying in the apparatus, wherein the filtration container lies in the chamber.

11. The apparatus as claimed in claim 10, wherein the container is mounted so as to move in the chamber.

12. The apparatus as claimed in claim 10, wherein the filtration container has a cylindrical filtration wall.

13. The apparatus as claimed in claim 10, further comprising heat exchange means that have the same shape as a part of the container and are placed coaxially with respect to said part.

14. The apparatus as claimed in claim 10, wherein the container has, at an axial end thereof, an opening for introduction and/or removal.

15. The apparatus as claimed in claim 10, further comprising means for scraping an internal face of the container.

16. The process as claimed in claim 3, wherein the motion comprises a rotational motion.

17. The process as claimed in claim 4, wherein the rotational motion is about an axis of symmetry of the container.

18. The process as claimed in claim 16, wherein the rotational motion is about an axis of symmetry of the container.

19. The process as claimed in claim 17, wherein the axis of symmetry of the container is an axis of symmetry of revolution of the container.

20. The process as claimed in claim 18, wherein the axis of symmetry of the container is an axis of symmetry of revolution of the container.

21. The apparatus as claimed in claim 11, wherein the container is mounted so as to move in the chamber in rotation about an axis of symmetry of the container.

22. The apparatus as claimed in claim 21, further comprising means for modifying the angle of inclination of the rotation axis.

* * * * *